United States Patent
Wang et al.

(10) Patent No.: US 11,586,528 B2
(45) Date of Patent: Feb. 21, 2023

(54) SOFTWARE DEVELOPMENT KIT WITH INDEPENDENT AUTOMATIC CRASH DETECTION

(71) Applicant: Agora Lab, Inc., Santa Clara, CA (US)

(72) Inventors: Weibo Wang, Shanghai (CN); Cheng Zhou, Shanghai (CN); Lianfu Hao, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 25 days.

(21) Appl. No.: 17/351,331

(22) Filed: Jun. 18, 2021

(65) Prior Publication Data

US 2022/0405191 A1    Dec. 22, 2022

(51) Int. Cl.
*G06F 11/36* (2006.01)
*G06F 9/54* (2006.01)
*G06F 9/48* (2006.01)
*G06F 8/77* (2018.01)

(52) U.S. Cl.
CPC ............ *G06F 11/3612* (2013.01); *G06F 8/77* (2013.01); *G06F 9/4881* (2013.01); *G06F 9/541* (2013.01)

(58) Field of Classification Search
CPC ...... G06F 11/3612; G06F 8/77; G06F 9/4881; G06F 9/541
USPC ................................................. 717/124–167
See application file for complete search history.

(56) References Cited

U.S. PATENT DOCUMENTS

| | | | |
|---|---|---|---|
| 7,120,901 B2 * | 10/2006 | Ferri | G06F 11/3636 714/48 |
| 8,001,527 B1 * | 8/2011 | Qureshi | G06F 11/079 717/172 |
| 8,356,211 B2 | 1/2013 | Benedek et al. | |
| 8,428,555 B2 | 4/2013 | Kim et al. | |
| 8,917,625 B2 | 12/2014 | Li et al. | |
| 9,386,154 B2 | 7/2016 | Assem et al. | |
| 10,574,978 B1 * | 2/2020 | He | H04N 7/15 |
| 10,713,151 B1 * | 7/2020 | Zinger | G06F 11/3684 |
| 10,776,194 B2 * | 9/2020 | Bath | G06F 16/24564 |

(Continued)

OTHER PUBLICATIONS

Diggins, Daniel. "ARLib: A C++ augmented reality software development kit." MSc computer animation NCCA Bournemouth University (2005).pp.1-53 (Year: 2005).*

(Continued)

*Primary Examiner* — Satish Rampuria
(74) *Attorney, Agent, or Firm* — The Law Offices of Konrad; Depeng Bi

(57) ABSTRACT

An improved SDK includes a set of APIs and a crash handler registered with the operating system. Each API is an interface accessible by a computer software application. Up on entrance, each API determines the current thread identifier, and inserts it into a list if it is not already in the list. Each thread identifier corresponds to an API call counter, which is incremented by one at the entrance and decremented by one at the exit point of the API. The SDK also records the identifier of the thread it creates for callback functions. When a crash occurs, the crash handler is executed. It determines that the crash is related to a callback interface if the crash thread identifier matches the callback thread identifier. The crash is determined to be caused by the SDK if the API call counter corresponding to the crash thread identifier is greater than zero.

7 Claims, 7 Drawing Sheets

(56) References Cited

U.S. PATENT DOCUMENTS

| | | | | |
|---|---|---|---|---|
| 2003/0191795 | A1* | 10/2003 | Bernardin | G06F 9/505 |
| | | | | 709/201 |
| 2011/0246727 | A1* | 10/2011 | Dice | G06F 12/0261 |
| | | | | 711/219 |
| 2015/0347220 | A1* | 12/2015 | Hermany | G06F 11/0775 |
| | | | | 714/48 |
| 2017/0242783 | A1* | 8/2017 | Chang | G06F 11/0778 |

OTHER PUBLICATIONS

Gong, Li, et al. "Going beyond the sandbox: An overview of the new security architecture in the Java Development Kit 1.2." USENIX Symposium on Internet Technologies and Systems (USITS 97). 1997. (Year: 1997).*

Xiao, Shundan, Jim Witschey, and Emerson Murphy-Hill. "Social influences on secure development tool adoption: why security tools spread." Proceedings of the 17th ACM conference on Computer supported cooperative work & social computing. 2014.pp. 1095-1106 (Year: 2014).*

Alberga, Cyril N., et al. "A program development tool." Proceedings of the 8th ACM SIGPLAN-SIGACT symposium on Principles of programming languages. 1981.pp. 92-104 (Year: 1981).*

Gomez-Sanz, Jorge J., et al. "INGENIAS development kit: a visual multi-agent system development environment." Proceedings of the 7th international joint conference on Autonomous agents and multiagent systems: demo papers. 2008.pp. 1-2 (Year: 2008).*

Error Monitoring & App Stability Management | Bugsnag, https://www.bugsnag.com, Bugsnag Inc.

\* cited by examiner

SOFTWARE DEVELOPMENT KIT WITH INDEPENDENT AUTOMATIC CRASH DETECTION

CROSS REFERENCE TO RELATED APPLICATIONS

NONE.

FIELD OF THE DISCLOSURE

The present invention generally relates to software development kits, and more particularly relates to a software development kit with independent automatic crash detection and identification capabilities.

DESCRIPTION OF BACKGROUND

Computer software application providers usually use one or more third-party software development kits (SDKs) to implement certain functionalities and features. For instance, with the rapid development of mobile computing over the Internet, many computer software applications (or applications for short) incorporate a third-party SDK to provide real-time voice and video communication capabilities. An SDK is a collection of computer software components providing various functionalities. It is usually incorporated by numerous applications and runs on thousands and even millions of computers, such as smartphones, tablet computers, desktop computers, etc. In one implementation, the application includes the computer programs forming part of the SDK. In a different implementation, at run-time, the application loads the SDKs binary foes. In either scenario, at run-time, the SDK runs within the computer process of the application. Each computer process has its own virtual memory address space.

The applications can be mobile apps running on mobile devices with operating systems, such as Android® and iOS®. The applications can also be software applications running on computers with operating systems like Microsoft Windows®, Mac OS®, etc. Due to various reasons and conditions, applications may sometimes crash. When an application crashes, it stops functioning properly. Immediate and proper handling of the crashes is highly desirable. Conventionally, crash handling of an application with an SDK relies on the crash diagnostic features of the underly operating system and/or the application. However, the source of a crash can be the SDKs. With SDKs incorporated into a big quantity of applications and executed on many computers, it is thus desirable to provide a new method and SDKs with capabilities to promptly determine whether crashes occurred inside the SDKs or are related to the SDKs. The desired new SDKs implement diagnostic functionality to immediately identify the source of crashes.

SUMMARY OF THE DISCLOSURE

Generally speaking, pursuant to the various embodiments, the present disclosure provides a software development kit (SDK). The SDK includes a first API, the first API is adapted to determine a thread identifier of a current thread at an entrance of the first API. The current thread executes the first API. The first API is further adapted to increment a corresponding API call counter of the thread identifier by one after the first API is called; and decrement the corresponding API call counter of the thread identifier by one before the first API is exited. The SDK also includes a crash handler. The crash handler is adapted to receive a crash identifier from an operating system running on a computer. The crash identifier corresponds to a crash. The crash handler is also adapted to determine a crash thread identifier from the crash identifier; determine whether the crash thread identifier is the same as the thread identifier; and when the crash thread identifier is the same as the thread identifier and the corresponding API call counter is greater than zero, provide an SDK internal crash indicator indicating that the crash is caused by the SDK. The SDK further includes a manager. The manager is adapted to register the crash handler with the operating system. The SDK is adapted to be loaded by a computer software application running on the computer. The crash handler provides the SDK internal crash indicator to a server software application running on a server system over the Internet. The first API is further adapted to determine whether the thread identifier exists in a list of pairs of thread identifiers and corresponding API call counters, wherein the list is initialized to be empty; and when the thread identifier does not exist in the list, insert the thread identifier and the corresponding API call counter into the list.

The SDK further includes a second API. The manager is adapted to create a callback thread. The callback thread has a callback thread identifier. The manager is further adapted to store the callback thread identifier. The second API is adapted to be accessed by the computer software application to register a callback interface, wherein the callback thread is adapted to access the callback interface. The crash handler is adapted to compare the callback thread identifier to the crash thread identifier. When the callback thread identifier is the same as the crash thread identifier, the crash handler is adapted to provide a callback crash indicator. The crash handler provides the callback crash indicator to a server software application running on a server system over the Internet.

Further in accordance with the present teachings is a computer-implemented method for determining whether a crash is related to a software development kit (SDK). The method is performed by the SDK and includes registering a crash handler of the SDK with an operating system running on a computer. The SDK is adapted to be loaded by a computer software application running on the computer. The method also includes determining a thread identifier of a current thread at an entrance of a first API of the SDK. The current thread executes the first API. The method further includes incrementing a corresponding API call counter of the thread identifier by one after the first API is called; decrementing the corresponding API call counter of the thread identifier by one before the first API is exited; and receiving a crash identifier from an operating system running on a computer. The crash identifier corresponds to a crash. The method also includes determining a crash thread identifier from the crash identifier; determining whether the crash thread identifier is the same as the thread identifier; and when the crash thread identifier is the same as the thread identifier and the corresponding API call counter is greater than zero, providing an SDK internal crash indicator indicating that the crash is caused by the SDK. The SDK internal crash indicator is provided to a server software application running on a server system over the Internet. The method also includes determining whether the thread identifier exists in a list of pairs of thread identifiers and corresponding API call counters; and when the thread identifier does not exist in the list, inserting the thread identifier and the corresponding API call counter into the list. Moreover, the method includes creating a callback thread, the callback thread identified by a callback thread identifier; storing the callback thread identifier; being accessed by the computer software application to register a callback interface, wherein the callback thread is adapted to access the callback interface; comparing the callback thread identifier to the crash thread identifier; and when the callback thread identifier is the same as the crash thread identifier, providing a callback crash indicator. The callback crash indicator is provided to a server software application running on a server system over the Internet.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
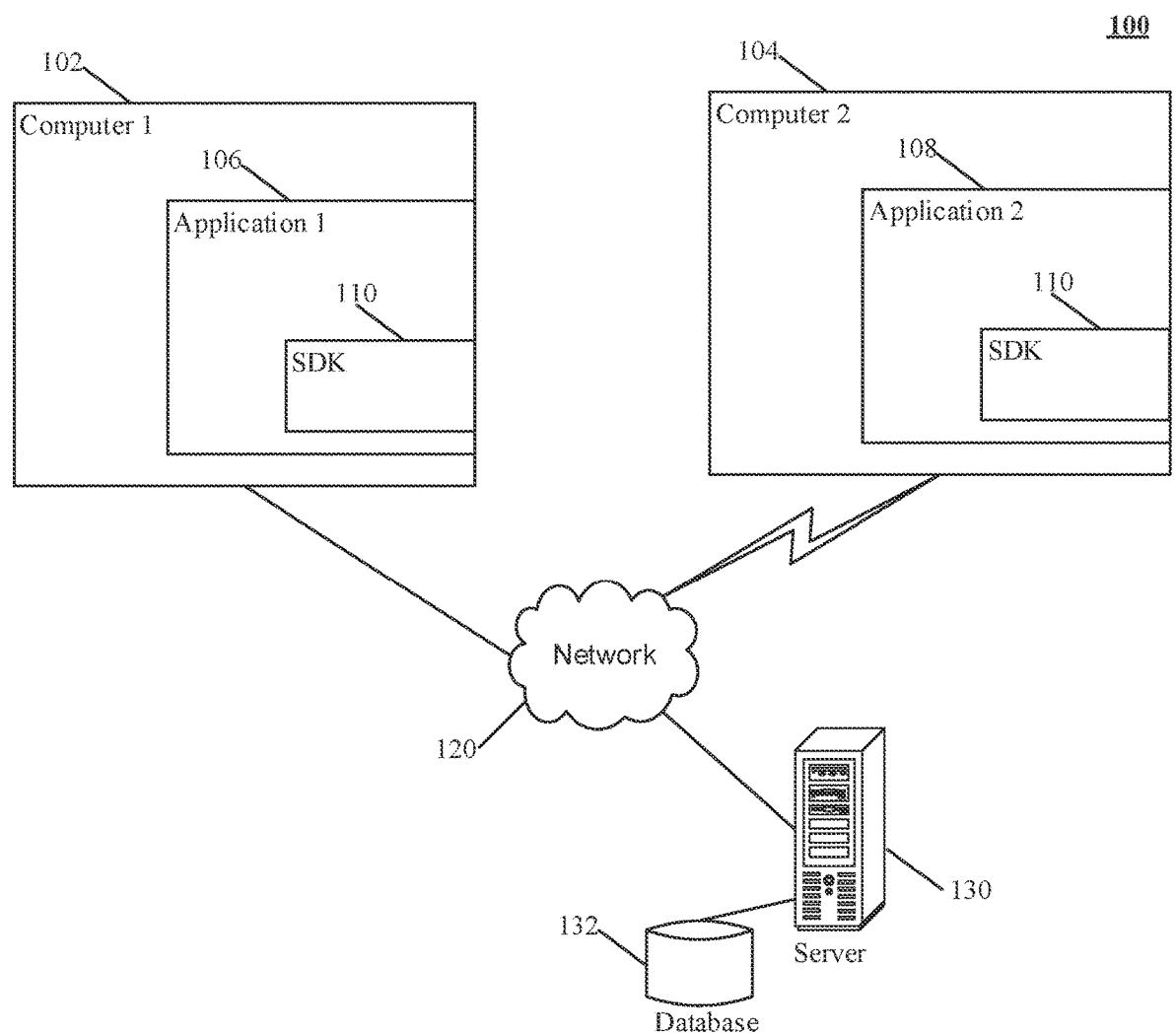
FIG. 1 is an illustrative block diagram of a communication system with the improved SDKs running within applications on multiple computers in accordance with this disclosure.

Turning to the Figures and to FIG. 1 in particular, an illustrative block diagram of a communication system is shown and generally indicated at 100. The communication system 100 includes a plurality of participating computers, such as those indicated at 102 and 104, a server system 130, and a database system 132 operatively coupled to the server system 130. The server system 130 includes one or more server computers in a server farm or in the Internet cloud. Each server computer includes one or more processing unit, some amount of memory operatively coupled to the processing unit, one or more network interfaces operatively coupled to the processing unit for accessing the wide area network (such as the Internet) 120 and the database systems 132, and an operating system.

The computers 102-104 communicate with each other and the server system 130 over the wide area network 120. They each includes a processing unit, some amount of memory operatively coupled to the processing units, and a network interface operatively coupled to the processing unit. The computers each may also include other interfaces operatively coupled to the processing unit, such as a video input inface, a video output interface, an audio input interface, an audio output interface, and user input interfaces (such as a keyboard, a touchpad, etc.). Each computer also runs a computer operating system, such as the operating system indicated at 302 shown in FIG. 3.

The computers 102-104 each runs an application, such as the ones indicated at 106 and 108. The applications 106-108 each access an improved SDK 110 that provides crash detection capabilities. At run-time, the new type of SDK 110 runs within the computer process created for each of the applications 106-108. The new SDK is further illustrated by reference to FIG. 2.

Figure 2:
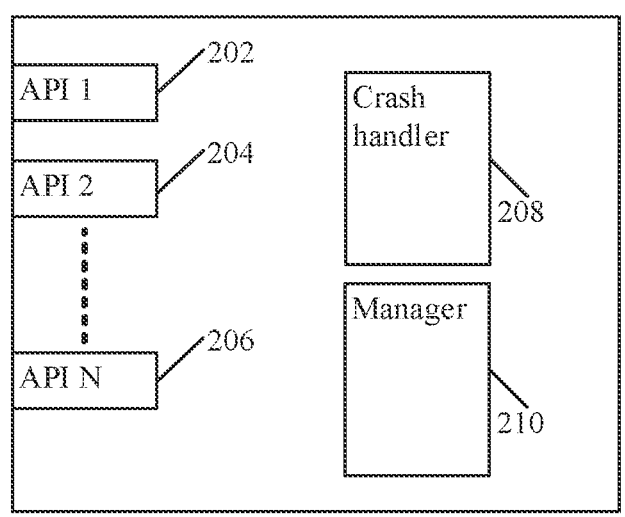
FIG. 2 is an illustrative block diagram of an improved SDK in accordance with this disclosure.

Referring to FIG. 2, a block diagram of the new SDK 110 is shown. The new SDK 110 includes a crash handler 208, a set of APIs 202, 204, 206, and a manager 210. Each API is an interface that applications 106-108 can call for the SDK 110 to perform a function, provide data, handle data, or provide other services. Each API is defined with specificities for applications to properly access. The features that APIs perform vary depending on the specific APIs. For example, APIs can establish and maintain voice communications, video communications, data communications, text communications, and any combination of the them. Each component of the new SDK 110 is a collection of computer software programs coded using one or more computer software programming languages, such as C, C++, C#, Java, etc.

Figure 3:
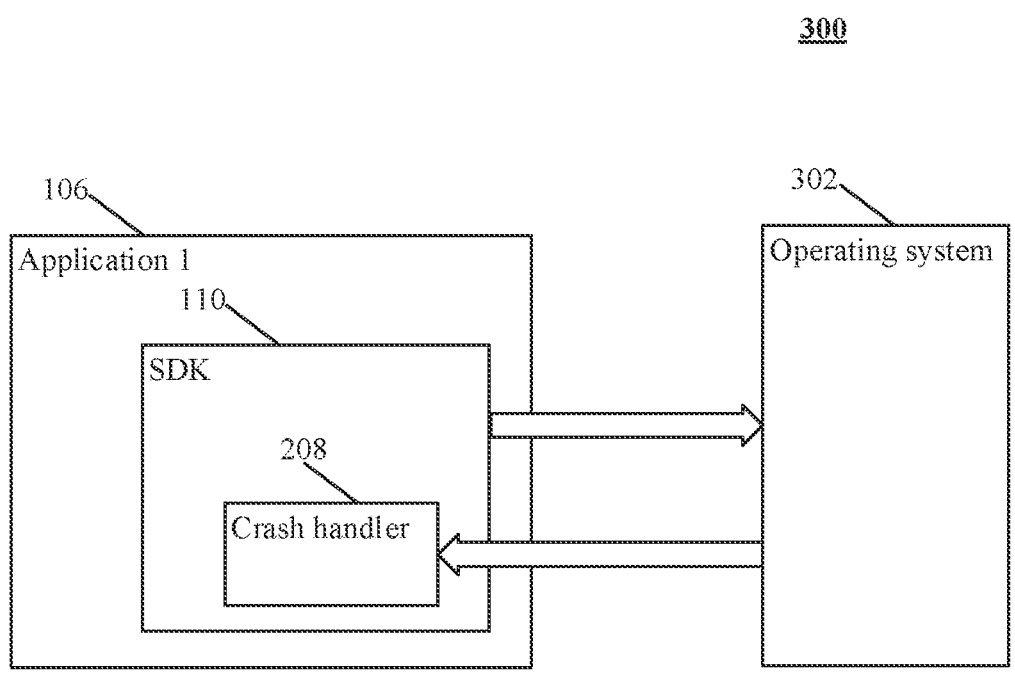
FIG. 3 is an illustrative block diagram of an improved SDK interacting with an operating system running on a computer in accordance with this disclosure.

Turning to FIG. 3, when the improved SDK is loaded or otherwise initialized on the computer 102, the manager 210 accesses the operating system 302 to register the crash handler 208. When computer crash occurs, the operating system 302 then calls or otherwise invokes the crash handler 208 with certain data pertaining to the crash. Such crash data is referred to herein as a crash identifier. In view of crash identification, the operating system 302 represents a crash management system on the computers 102-104.

Figure 4:
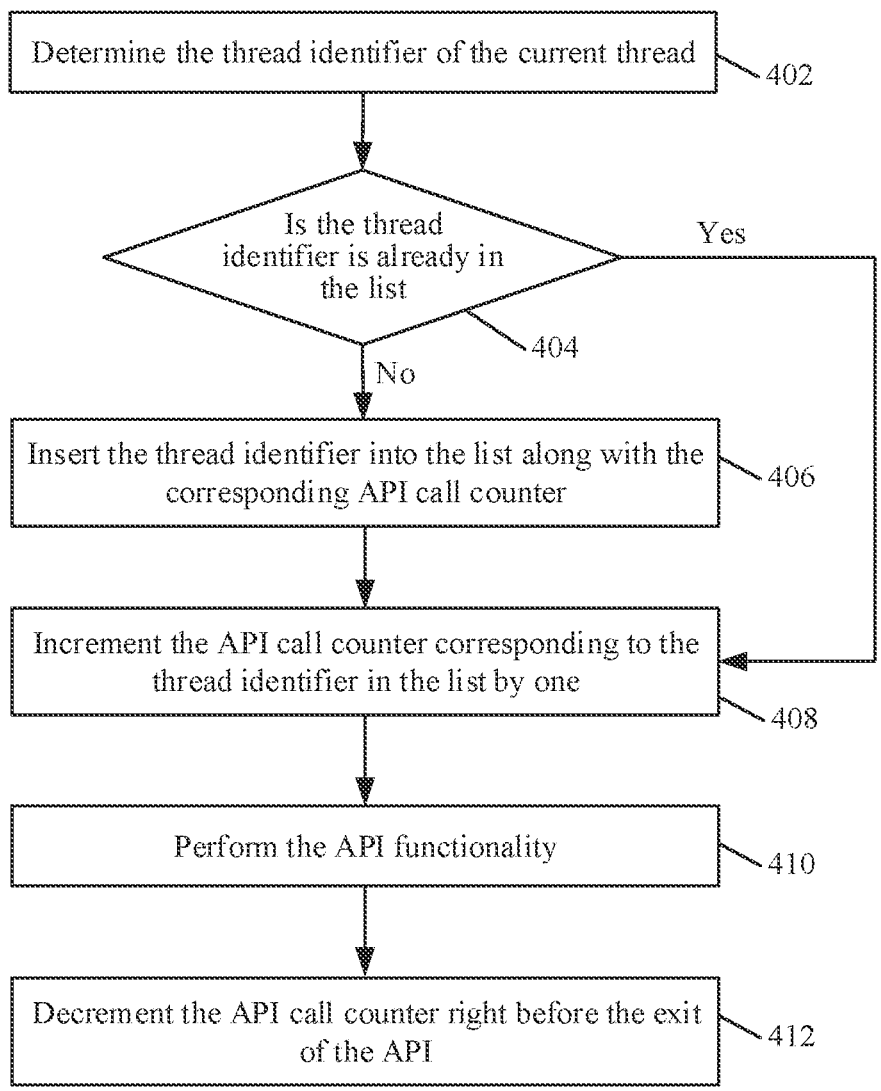
FIG. 4 is a flowchart illustrating a process by which an improved SDK determines the source of a crash in a computer in accordance with this disclosure.
Figure 5:
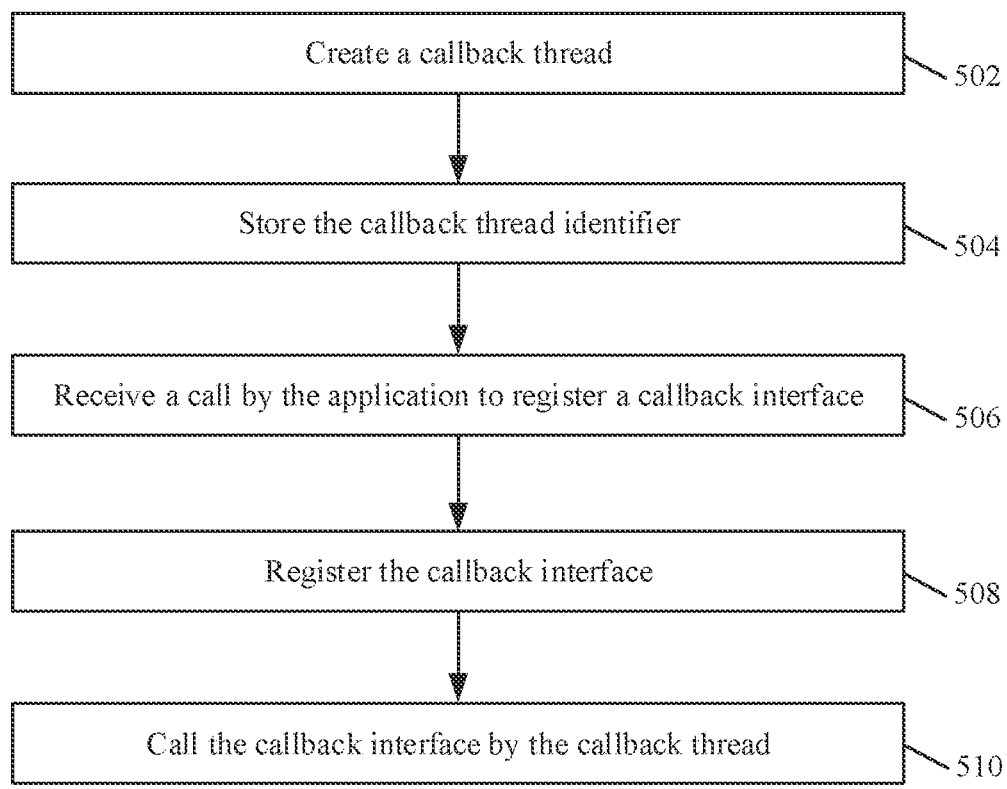
FIG. 5 is a flowchart illustrating a process by which an improved SDK implements callback functionality in a computer in accordance with this disclosure.
Figure 6:
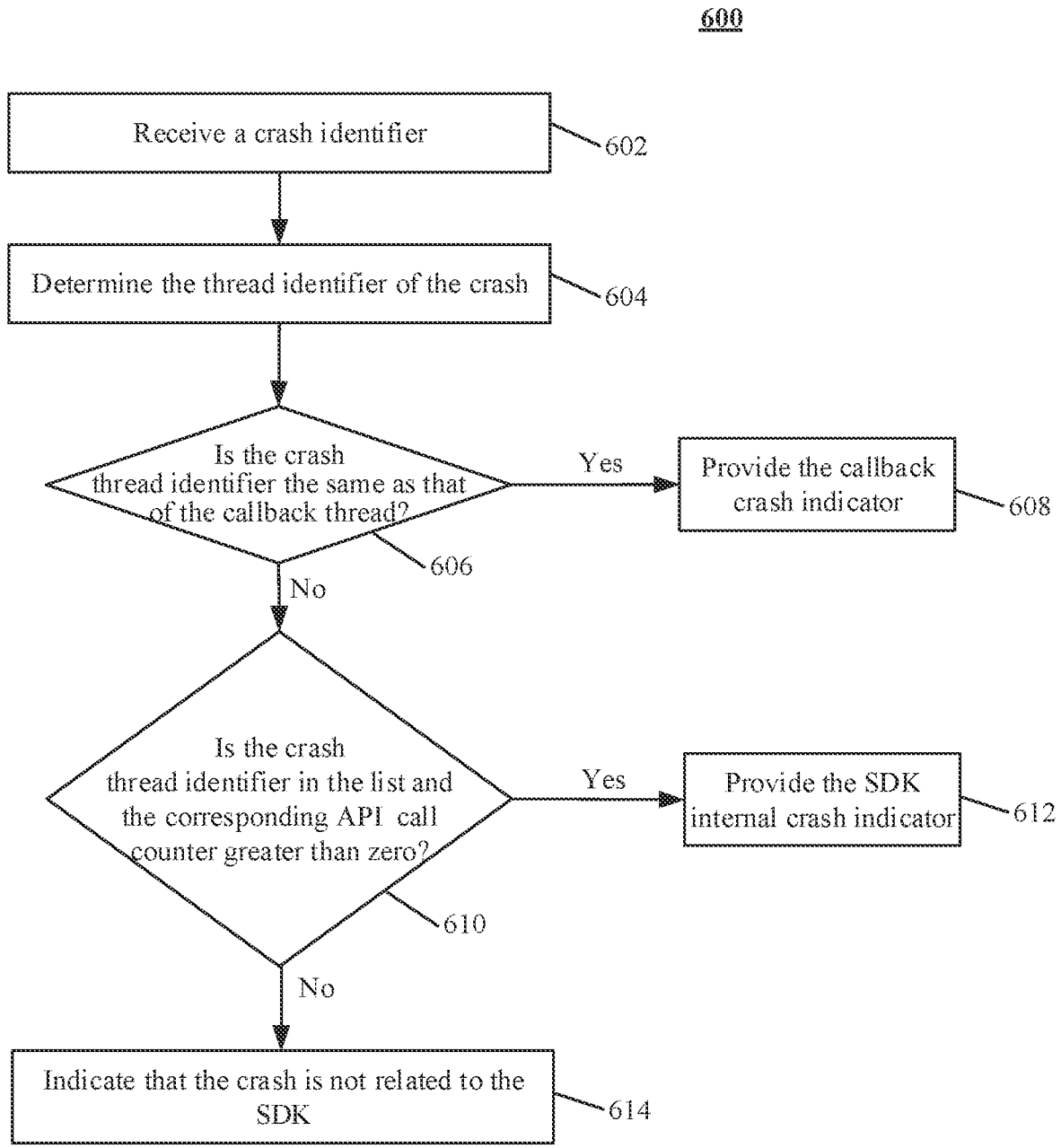
FIG. 6 is a flowchart illustrating a process by which an improved SDK determines the source of a crash in a computer in accordance with this disclosure.
Figure 7:
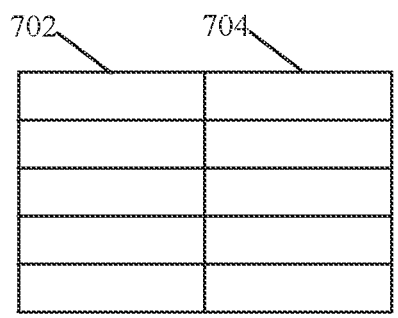
FIG. 7 is an illustrative block diagram of a list of thread identifiers and corresponding API calling counters within an improved SDK in accordance with this disclosure.

FIGS. 4, 5 and 6 are flowcharts illustrating the processes by which the new SDK 110 determines that crashes on a computer is within an SDK or not. Turning first to FIG. 4, the process by which the new SDK 110 collects data for determining the source of a crash is shown and generally indicated at 400. When the application 106 calls an API, such as the API 202, the API 202 is said to have been entered. At the entrance of the API 202, the API 202 determines the thread identifier of the current thread at 402. The current thread is the thread that is executing the program of the API 202 when the API 202 is called. At 404, the API 202 determines whether the determined thread identifier (i.e., the current thread identifier) is already in a list of thread identifier maintained by the SDK 110 at run-time. The list is further shown in FIG. 7 and generally indicated at 700. The list 700 includes a list of thread identifiers 702 and a corresponding list of API call counters 704. The list is empty when the SDK 110 is first loaded at run-time. In one implementation, the list 700 is managed by the manager component 210 of the SDK 110.

Turning back to FIG. 4, if the thread identifier is not in the list 700, at 406, the API 202 inserts the thread identifier into the list 700 with the corresponding API call counter set to the value of zero. The API call counter s then set to the value of one at 406. Alternatively, the API call counter is set to the value of one when it is inserted into the list 704. In such a case, the element 406 is also said to have been performed. Turning back to 404, if the thread identifier is already in the list 700, at 408, the API 202 increments the API call counter, corresponding to the thread identifier, by one in the list 700. At 410, the API 202 performs the desired function, such as sending or retrieving a piece of data. At 412, right before exiting from the API 202, the API 202 decrements the API call counter that is incremented by one at 406. Accordingly, if there is not any crash within the API 202 while it is executed by the computer 102, the API call counter's value should stay the same after the API 202 is exited.

The new SDK 110 also provides the callback capability. In other words, the application 106 accesses a registration API provided by the SDK 110 to register a callback function. When certain criteria is met, the new SDK 110 accesses or calls the callback function. When the callback function is being executed by the computer 102, a crash can occur. In such a situation, it is desirable for the SDK 110 to determine that the crash is related to the SDK 110. The handling of callbacks by the SDK 110 is further illustrated by reference to FIG. 5.

Figure 8:
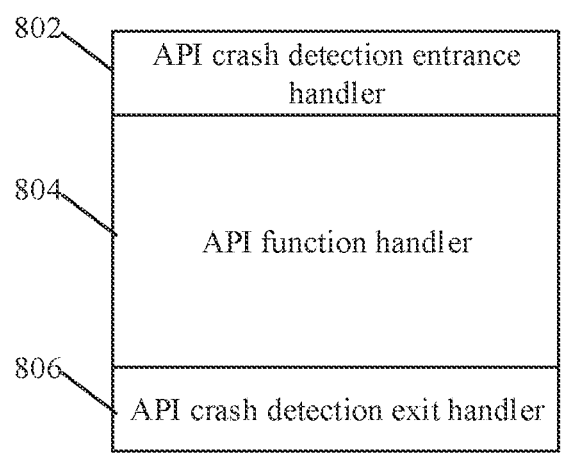
FIG. 8 is an illustrative block diagram of an API of an improved SDK in accordance with this disclosure.

The APIs, such as the API 202, are further illustrated by reference FIG. 8. Turning to FIG. 8, a block diagram illustrating the API 202 is shown. The API 202 includes three components or parts 802, 804, and 806. The component 802 is an API crash detection entrance handler; the component 804 is an API function handler that provides the functionality that the applications 106-108 expects the API 202 to perform and provide; and the component 806 is an API crash detection exit handler. In one implementation, the API crash detection entrance handler 802 performs the elements 402, 404, 406 and 408; the API function handler performs the element 410; and the API crash detection exit handler performs the element 412. The element 410 is performed after the element 408 is performed while the element 412 is performed after the element 410 is performed.

Referring to FIG. 5, at 502, the SDK 110 creates a thread for calling back a callback interface. In one implementation, the manager component 210 creates the callback thread and the callback thread performs certain functions, such as retrieving data over the network and providing the data to the application 106 by calling the callback interface. It can be created when the SDK 110 is initialized or when the need is present. At 504, the SDK 110 stores the callback thread identifier in, for example, a memory location. At 506, the SDK 110 receives a call by the application 106 to register a callback interface. For instance, the application 106 accesses the callback interface registration API exposed by the SDK 110 to register the callback function. At 508, the SDK 110 registers the callback interface. At 510, the new SDK accesses the registered callback interface. For example, the access is made by a program running on the callback thread.

When a crash occurs on the computer 102, the operating system 302 calls the crash handler 208. The process by which the crash handler 208 handles the crash and determines whether the crash is related to the SDK 110 is shown in FIG. 6 and generally indicated at 600. At 602, the crash handler receives the crash identifier provided by the operating system 302. The crash identifier is not necessarily a single integer. Rather, it is a collection of data indicating the crash. At 604, the crash handler 208 of the new SDK 110 determines the thread identifier of the thread causing the crash from the crash identifier. At 606, the crash handler 208 determines whether the crash thread identifier is same as the callback thread identifier. If so, at 608, the crash handler 208 provides an indicator (such as a message) indicating that the crash is caused by the callback interface of the application 106. In one implementation, the callback crash indicator is a message sent to the server software application running on the server system 130. The server software application processes the message and may optionally stores it into the database 132.

Turning back to 606, if they are not the same thread identifier, at 610, the crash handler 208 determines whether the crash thread identifier is in the list 700 and, if so, whether the corresponding API call counter greater than zero or not. If the crash thread identifier is in the list 700, and the corresponding API call counter is greater than zero, at 612, the crash handler provides an SDK internal crash indicator. The SDK internal crash indicator can be, for example, a message sent to the server software application, or a different recipient. Turning back to 610, if either of the two conditions is not met, at 614, the crash handler 208 indicates that the crash is not related to the SDK 110. The element 614 can be optional.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim (s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:
1. A software development kit (SDK) comprising:
(1) a first API, said first API capable to:

(a) determine a thread identifier of a current thread at an entrance of said first API, said current thread executing said first API;
(b) increment a corresponding API call counter of said thread identifier by one after said first API is called; and
(c) decrement said corresponding API call counter of said thread identifier by one before said first API is exited;

(2) a crash handler, said crash handler capable to:
(a) receive a crash identifier from an operating system running on a computer, said crash identifier corresponding to a crash;
(b) determine a crash thread identifier from said crash identifier;
(c) determine whether said crash thread identifier is the same as said thread identifier; and
(d) when said crash thread identifier is the same as said thread identifier and said corresponding API call counter is greater than zero, provide an SDK internal crash indicator indicating that said crash is caused by said SDK wherein said crash handler provides said SDK internal crash indicator to a server software application running on a server system over the Internet;

(3) a manager, said manager capable to register said crash handler with said operating system, SDK capable to be loaded by a computer software application running on said computer (4) a second API, wherein:
1) said manager is capable to create a callback thread, said callback thread having a callback thread identifier;
2) said manager is further capable to store said callback thread identifier;
3) said second API is capable to be accessed by said computer software application to register a callback interface, wherein said callback thread is capable to access said callback interface;
4) said crash handler is capable to compare said callback thread identifier to said crash thread identifier; and
5) when said callback thread identifier is the same as said crash thread identifier, said crash handler is capable to provide a callback crash indicator.

2. The SDK of claim/wherein said crash handler provides said callback crash indicator to a server software application running on a server system over the Internet.

3. The SDK of claim 1 wherein said first API is further capable to:
(1) determine whether said thread identifier exists in a list of pairs of thread identifiers and corresponding API call counters, wherein said list is initialized to be empty; and
(2) when said thread identifier does not exist in said list, insert said thread identifier and said corresponding API call counter into said list.

4. A computer-implemented method for determining whether a crash is related to a software development kit (SDK), said method performed by said SDK and comprising:
1) registering a crash handler of said SDK with an operating system running on a computer, said SDK capable to be loaded by a computer software application running on said computer;
2) determining a thread identifier of a current thread at an entrance of a first API of said SDK, said current thread executing said first API:
3) incrementing a corresponding API call counter of said thread identifier by one after said first API is called;
4) decrementing said corresponding API call counter of said thread identifier by one before said first API is exited;
5) receiving a crash identifier from an operating system running on a computer, said crash identifier corresponding to a crash;
6) determining a crash thread identifier from said crash identifier;
7) determining whether said crash thread identifier is the same as said thread identifier;
8) when said crash thread identifier is the same as said thread identifier and said corresponding API call counter is greater than zero, providing an SDK internal crash indicator indicating that said crash is caused by said SDK;
9) creating a callback thread, said callback thread identified by a callback thread identifier;
10) storing said callback thread identifier;
11) being accessed by said computer software application to register a callback interface, wherein said callback thread is capable to access said callback interface;
12) comparing said callback thread identifier to said crash thread identifier; and
13) when said callback thread identifier is the same as said crash thread identifier, providing a callback crash indicator.

5. The method of claim 4 wherein said callback crash indicator is provided to a server software application running on a server system over the Internet.

6. The method of claim 4 wherein said SDK internal crash indicator is provided to a server software application running on a server system over the Internet.

7. The method of claim 4 further comprising:
(1) determining whether said thread identifier exists in a list of pairs of thread identifiers and corresponding API call counters; and
(2) when said thread identifier does not exist in said list, inserting said thread identifier and said corresponding API call counter into said list.

* * * * *